(12) United States Patent
Blessing et al.

(10) Patent No.: US 9,834,083 B2
(45) Date of Patent: Dec. 5, 2017

(54) DRIVE TRAIN FOR A MOTOR VEHICLE

(71) Applicant: GETRAG Getriebe—und Zahnradfabrik Hermann Hagenmeyer GmbH & Cie KG, Untergruppenbach (DE)

(72) Inventors: Uli Christian Blessing, Heilbronn (DE); Jörg Meissner, Bretzfeld (DE); Thomas Hoffmeister, Korntal-Munchingen (DE); Harald Ihben, Ludwigsburg (DE); Philipp Knöpfle, Ludwigsburg (DE)

(73) Assignee: GETRAG Getriebe—und Zahnradfabrik Hermann Hagen, Untergruppenbach (DE)

( * ) Notice: Subject to any disclaimer, the term of this patent is extended or adjusted under 35 U.S.C. 154(b) by 375 days.

(21) Appl. No.: 14/220,400

(22) Filed: Mar. 20, 2014

(65) Prior Publication Data

US 2014/0283647 A1    Sep. 25, 2014

(30) Foreign Application Priority Data

Mar. 21, 2013 (DE) .......................... 10 2013 004 874

(51) Int. Cl.
 *F16H 37/06* (2006.01)
 *B60K 6/42* (2007.10)
 (Continued)

(52) U.S. Cl.
 CPC .................. *B60K 6/42* (2013.01); *B60K 6/40* (2013.01); *B60K 6/405* (2013.01); *B60K 6/48* (2013.01);
 (Continued)

(58) Field of Classification Search
 CPC .... B60K 2006/4833; B60K 2006/4841; B60K 2006/4825; B60K 2006/4816;
 (Continued)

(56) References Cited

U.S. PATENT DOCUMENTS

| | | | |
|---|---|---|---|
| 3,861,485 A | * | 1/1975 | Busch ...................... B60K 1/00 180/65.7 |
| 4,134,596 A | | 1/1979 | Kawai et al. |

(Continued)

FOREIGN PATENT DOCUMENTS

| | | |
|---|---|---|
| DE | 2241496 A1 | 3/1974 |
| DE | 4202360 A1 | 8/1992 |

(Continued)

OTHER PUBLICATIONS

European Search Report dated Jul. 7, 2014, 7 pages.
German Search Report dated Nov. 25, 2013, 6 pages.
DE102012019971.6 (non-published).

*Primary Examiner* — Ha D Ho
(74) *Attorney, Agent, or Firm* — Reising Ethington P.C

(57) ABSTRACT

A drive train for a motor vehicle comprises an internal combustion engine which has a crankshaft and is designed to provide drive power for the motor vehicle. A clutch arrangement has an input member and at least one output member, the input member being connected to the crankshaft. A transmission arrangement implements a plurality of gear stages, the transmission arrangement having a transmission housing, at least one input shaft, and at least one output shaft. The output shaft is connectable to driven wheels of the motor vehicle. An electric machine is designed to provide drive power for the motor vehicle and is connected to a transmission shaft of the transmission arrangement. The transmission shaft has a shaft section which (Continued)

extends from the transmission housing and is connected to the electric machine via a traction drive mechanism.

15 Claims, 2 Drawing Sheets

(51) Int. Cl.
    *B60K 6/40*     (2007.10)
    *B60K 6/405*     (2007.10)
    *B60K 6/48*     (2007.10)
    *F16H 55/36*     (2006.01)

(52) U.S. Cl.
    CPC ...... *B60K 2006/4833* (2013.01); *F16H 55/36* (2013.01); *Y02T 10/6221* (2013.01); *Y10S 903/902* (2013.01); *Y10T 74/19014* (2015.01)

(58) Field of Classification Search
    CPC .... B60K 2006/4808; B60K 6/42; B60K 6/44; B60K 6/442; B60K 6/46; B60K 6/48; B60K 17/342; B60K 6/40; F16H 55/36; F16H 3/006; F16H 3/08; F16H 2003/008; F16H 7/00; F16H 3/091; F16H 37/065; F16H 7/20; F16H 7/005
    See application file for complete search history.

(56) References Cited

U.S. PATENT DOCUMENTS

| | | | | |
|---|---|---|---|---|
| 5,562,565 | A * | 10/1996 | Moroto | B60K 6/365 180/65.6 |
| 6,251,042 | B1 * | 6/2001 | Peterson | B60K 6/48 477/3 |
| 6,640,917 | B2 * | 11/2003 | Maruyama | B60K 6/48 180/65.25 |
| 6,719,654 | B2 | 4/2004 | Deichl et al. | |
| 7,367,416 | B2 | 5/2008 | Seufert et al. | |
| 7,950,480 | B2 | 5/2011 | Raoul | |
| 8,267,825 | B2 * | 9/2012 | Kakinuma | B60K 6/48 475/152 |
| 8,328,674 | B2 * | 12/2012 | Swales | B60K 6/365 475/151 |
| 8,955,411 | B2 * | 2/2015 | Raisch | 74/661 |
| 8,978,516 | B2 * | 3/2015 | Funk | B60K 6/36 74/665 A |
| 9,003,907 | B2 * | 4/2015 | Weller | F16H 3/093 74/331 |
| 2001/0042647 | A1 * | 11/2001 | Sakamoto et al. | 180/65.2 |
| 2002/0040818 | A1 * | 4/2002 | Maruyama | 180/65.2 |
| 2003/0104901 | A1 * | 6/2003 | Fukushima | B60K 6/36 477/3 |
| 2005/0098365 | A1 * | 5/2005 | Hanyu et al. | 180/65.2 |
| 2010/0311540 | A1 * | 12/2010 | Hellenbroich | B60K 6/40 477/5 |
| 2011/0098151 | A1 | 4/2011 | Ziemer | |

FOREIGN PATENT DOCUMENTS

| | | | |
|---|---|---|---|
| DE | 20118908 | A1 | 2/2002 |
| DE | 10103188 | A1 | 8/2002 |
| DE | 20023598 | U1 | 2/2005 |
| DE | 102004008154 | A1 | 9/2005 |
| DE | 60202634 | T2 | 1/2006 |
| DE | 102008002381 | A1 | 12/2009 |
| DE | 102011009015 | A1 | 3/2012 |
| EP | 1232890 | A2 | 8/2002 |
| EP | 1554154 | A1 | 7/2005 |
| FR | 2689821 | A1 * | 10/1993 .............. B60K 6/02 |
| FR | 2772675 | A1 | 6/1999 |
| FR | 2975047 | A1 | 10/2012 |
| WO | WO8804001 | * | 6/1988 |
| WO | WO2005110795 | A1 | 11/2005 |
| WO | WO2012137151 | A1 | 10/2012 |

* cited by examiner

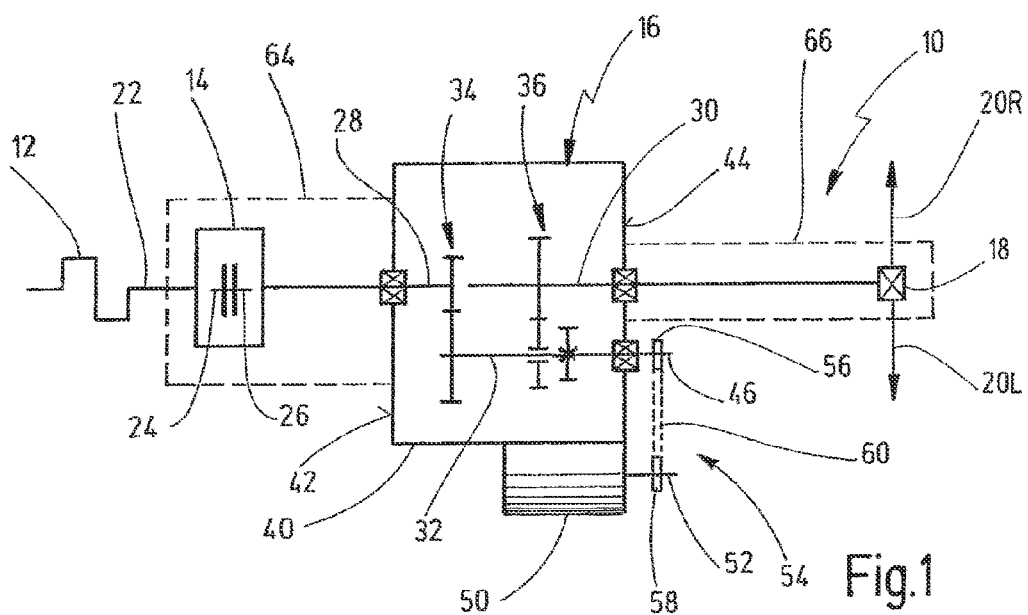
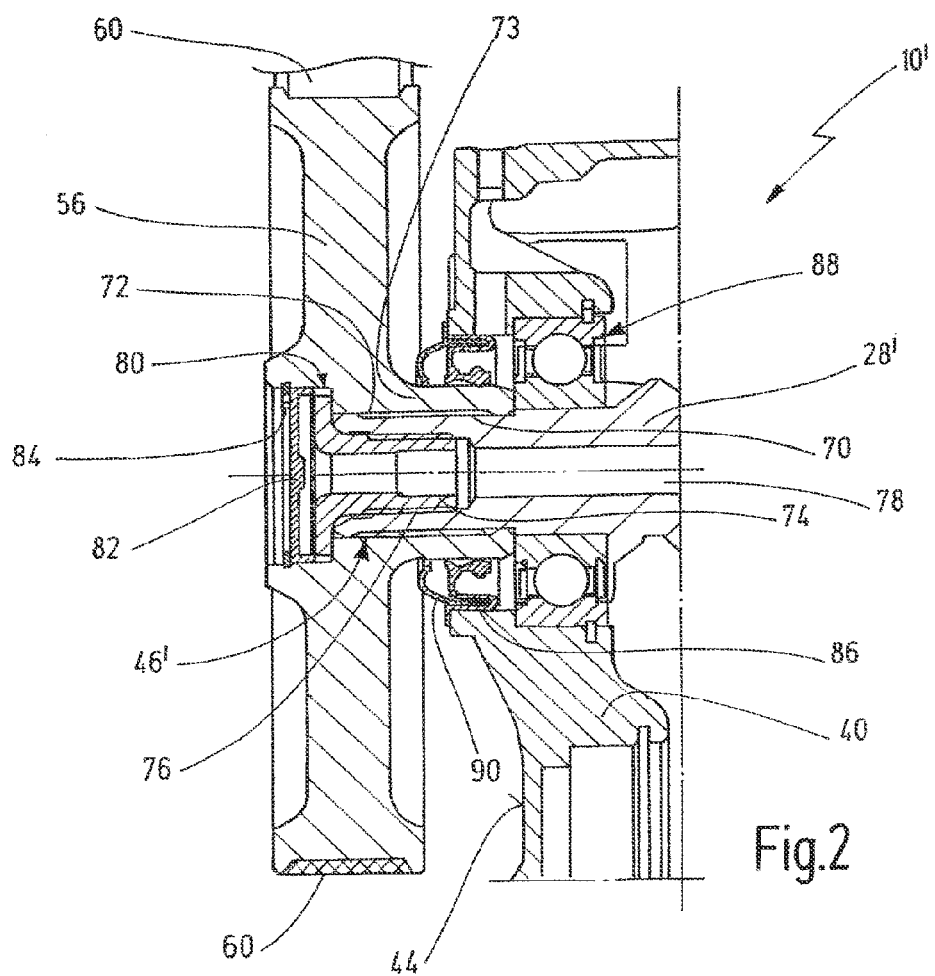

DRIVE TRAIN FOR A MOTOR VEHICLE

CROSS REFERENCES TO RELATED APPLICATIONS

This application claims the priority of German patent application DE 10 2013 004 874.5, filed Mar. 21, 2013, which is incorporated herein by reference.

BACKGROUND OF THE INVENTION

The present invention relates to a drive train for a motor vehicle, comprising an internal combustion engine which has a crankshaft and is designed to provide drive power for the motor vehicle, a clutch arrangement having an input member and at least one output member, the input member being connected to the crankshaft, a transmission arrangement for implementing a plurality of gear stages, the transmission arrangement having a transmission housing, at least one input shaft and at least one output shaft, the output shaft being connectable to driven wheels of the motor vehicle, and an electric machine which is designed to provide drive power for the motor vehicle and is connected to a transmission shaft of the transmission arrangement.

A drive train of this type is generally known and is also referred to as a hybrid drive train, since drive power can be provided both by an internal combustion engine and by an electric machine operated as an electric motor.

In this case it is known to connect the electric machine to a transmission input shaft or to a transmission output shaft.

A drive train of this type in the form of an automated manual transmission is known from the document EP 1 554 154 B1, wherein the electric machine is connectable via a clutch to an output shaft of the transmission arrangement and wherein the electric machine is further connectable non-rotatably to the crankshaft of the internal combustion engine while bypassing the clutch arrangement on the input side in order to start the internal combustion engine or to be driven by the internal combustion engine. Here the electric machine is arranged generally outside the transmission housing and the motor shaft extends into the transmission housing. Inside the transmission housing the output shaft of the electric machine is preferably connected coaxially to a countershaft on which shift clutches are arranged in order to implement the above-mentioned functions.

SUMMARY OF THE INVENTION

Against this background it is an object of the invention to specify an improved drive train for a motor vehicle in which hybridisation is possible at a cost as low as possible.

This object is achieved in the drive train mentioned in the introduction in that the transmission shaft has a shaft section which extends out of the transmission housing and is connected to the electric machine via a traction drive mechanism.

In this embodiment, the electric machine is arranged generally outside the transmission housing, preferably between two axial ends thereof. Through the connection of a motor shaft of the electric machine to the shaft section of the transmission shaft, on the one hand the position of the electric machine, viewed in the circumferential direction of the transmission housing, can to a large extent be selected freely. The electric machine can thereby be fastened in a simple manner to the outside of the transmission housing, especially radially outside the transmission housing.

Furthermore, a suitable transmission ratio can be implemented via the traction drive mechanism, so that fast-rotating and therefore compact electric machines can also be used for hybridisation.

Overall, the drive train according to the invention yields at least one of the following advantages:

Firstly, because of the connection via a traction drive mechanism, the connection can be implemented without a further gear stage or via a small number of gear stages, so that the cost-intensive development and implementation of gear stages can be avoided. Secondly, cooling of the electric machine can be simplified as it is not arranged within the transmission housing. Consequently, the transmission arrangement itself does not necessarily have to meet the requirements for the high-voltage technology generally used for electric machines in vehicle construction.

Consequently, a less complex overall design with regard to the power transmission from the electric machine to the transmission arrangement, or vice versa, is achieved. Installation of the electric machine can also be simplified. In addition, there are fewer constructional deviations from a conventional drive train which lacks an electric machine. The transmission housing can be designed in such a way that it can either be implemented with a shaft which has a shaft section extending out of the transmission housing, or may have a cover for the housing opening through which the shaft section extends from the transmission housing. A standard housing can therefore be used for both types of drive train.

Furthermore, there is greater design freedom in the selection of the electric machine, with regard to its dimensions and/or performance data. In addition a clear system-separation between the transmission arrangement and the components of the electric machine can be achieved, simplifying validation and testing responsibility. Finally, use can be made of components which are already available in volume production or are used in other applications and do not require new validations.

The traction drive mechanism may be a chain drive or a belt drive. The belt drive may be implemented by means of a V-belt or a toothed belt, a toothed belt being preferred.

The power of the electric machine is preferably limited to a value lower than a predefined threshold value adapted to the transmission capability of the traction drive mechanism. This threshold value is preferably less than 25 kW, preferably less than 20 kW, in particular less than 15 kW. The electric machine may, in particular, be operated at a voltage lower than that of conventional high-voltage applications or plug-in applications.

The electric machine may be connected to any transmission shaft, preferably to an input shaft of the transmission arrangement. However, the electric machine may also be connected to an output shaft. Furthermore, it is possible in general to connect the electric machine selectively to the input shaft or the output shaft via a shift clutch arrangement provided in the transmission arrangement. With a dual-clutch transmission it is another option to connect the electric machine selectively to one or the other partial transmission of the dual-clutch transmission via such a shift clutch arrangement.

The object is therefore achieved in full.

According to an especially preferred embodiment, the transmission shaft is the at least one input shaft of the transmission arrangement or a layshaft of the transmission arrangement connected to the input shaft via a fixed transmission ratio.

With this embodiment the electric machine may be used, on the one hand, for a purely electric drive, in which case the clutch arrangement is disengaged in order not to entrain the internal combustion engine. On the other hand, the electric machine may also be used to start the internal combustion engine, in which case the shift clutches in the transmission arrangement are disengaged in order to disconnect a connection to the output drive.

Finally, with such a connection a multiplicity of further hybrid applications is possible, for example boost mode, energy recovery mode, etc.

According to a further preferred embodiment, the transmission housing has a first axial end oriented towards the internal combustion engine and a second axial end oriented away from the internal combustion engine, the traction drive mechanism being arranged at the second axial end.

With this embodiment, the traction drive mechanism can be connected to the transmission shaft without the need to interrupt the generally standardised connection between crankshaft, clutch arrangement and transmission arrangement.

According to a further preferred embodiment, the shaft section which extends from the transmission housing has a splined section, a first traction drive wheel (for example, a belt pulley or a sprocket) having a complementary splined section and the first traction drive wheel being fitted to the splined section in the axial direction in order to produce a rotationally fixed connection between the first traction drive wheel and the shaft section.

Such splined sections are commonly used in transmission technology, so that they can be produced at low cost.

Furthermore, it is generally advantageous if the traction drive mechanism has a first traction drive wheel, the shaft section of the transmission shaft having a threaded axial bore and the first traction drive wheel being fixed axially to the shaft section by means of a screw.

The traction drive wheel can thereby be fixed axially to the shaft section in a simple manner.

In this case it is especially preferred if the first traction drive wheel has an axial fixing bore in which a head of the screw and a sealing element are received.

The axial fixing bore preferably has a larger diameter than the threaded axial bore. By means of the sealing element it can be avoided that contaminants reach the interior of the transmission via the thread contact between threaded bore and screw, so that a fluid exchange via the threaded portion is not possible. Consequently, no fluid, such as water, can penetrate the transmission from the outside. Equally, transmission fluid cannot leak from the transmission housing via this fastening arrangement.

The sealing element may be secured in the axial fixing bore, for example, by a circlip or the like.

According to a further preferred embodiment, the traction drive mechanism has a first traction drive wheel which has a hollow shaft section extending around the shaft section of the transmission shaft, a shaft seal being arranged between a housing opening of the transmission housing and the outer circumference of the hollow shaft section of the first traction drive wheel.

Fluid-tightness between the inside and outside of the transmission housing can also be ensured in this way.

In this case the hollow shaft section may preferably bear in the axial direction against a shaft bearing, for mounting the transmission shaft, arranged on the inside of the transmission housing, especially against the inner race of said bearing.

In other words, in this embodiment the hollow shaft section may extend into the transmission housing.

It is further advantageous if the electric machine is fixed rigidly or adjustably by means of a fastening device to an outer side of the transmission housing.

The fastening device may be configured, on the one hand, to fix different types of electric machines to the transmission housing. In addition, the fastening device may be designed to fix the electric machine to the transmission housing adjustably in a direction transverse to the machine shaft, for example in order to adjust the tension of the traction drive mechanism.

In a further preferred embodiment, a suitable tensioning roller may be provided to tension or slacken the traction drive mechanism, which tensioning roller is fastened to the outside of the transmission housing adjustably in a direction transverse to the machine shaft.

In some of the above-described variants, the first traction drive wheel is arranged adjacent to an axial end of the transmission housing.

In an alternative embodiment, the transmission shaft is a countershaft which is arranged parallel to and offset from the at least one input shaft and parallel to and offset from the at least one output shaft, and on which a secondary gear wheel for connecting the countershaft to the at least one input shaft or to the at least one output shaft is mounted.

In this embodiment the countershaft may be configured shorter in the axial direction than the axial extent of the transmission housing and, in the simplest case, provides only the rotational mounting for the secondary gear wheel.

The secondary gear wheel preferably meshes with a gear of a shift gear set of the transmission arrangement, which gear may be a fixed wheel or a loose wheel.

If the teaching according to the invention is applied to a dual-clutch transmission comprising an input shaft arrangement with a first input shaft extending over the full axial length of the transmission housing and a second input shaft in the form of a hollow shaft extending over only a part of the axial length of the transmission housing, in this variant the secondary gear may additionally mesh with a gear which is connected or connectable to the hollow shaft. Consequently, with this embodiment the electric machine may be connected not only to an input shaft of the first partial transmission, which is associated with the first input shaft extending over the full axial length, but also to the second input shaft which is associated with the other partial transmission.

In this case it is especially preferred if the transmission housing has a first axial end oriented towards the internal combustion engine and a second axial end oriented away from the internal combustion engine, the traction drive mechanism being arranged in the axial direction between the first and the second axial ends of the transmission housing and radially outside the transmission housing.

In the variants in which the traction drive mechanism is connectable to a transmission shaft via the secondary gear wheel, a wide spectrum of possible transmission ratios is produced, some of which can be implemented via the traction drive mechanism and others via the ratio between the secondary gear and the gear which forms part of a shift gear set of the transmission arrangement.

As compared to a conventional drive train which does not have an electric machine, with the drive train according to the invention superior acceleration values, enhanced comfort, improved dynamics, and fuel saving can in general be achieved.

As compared to a hybrid drive train in which the electric machine is integrated in the interior of the transmission housing, simplified assembly, improved system-separation between transmission and electric machine, cost saving, and a power-transmission design of low overall complexity, are achieved.

Self-evidently, the aforementioned features and those still to be explained below can be used not only in the particular combination specified but also in other combinations or in isolation, without departing from the scope of the present invention.

BRIEF DESCRIPTION OF THE DRAWINGS

Exemplary embodiments of the invention are represented in the drawings and are explained in more detail in the following description. In the drawings:

FIG. 1 is a schematic representation of an embodiment of a drive train according to the invention;

FIG. 2 is an axial sectional view of a detail of an example according to the invention of a connection of a traction drive mechanism to a shaft section of a transmission shaft;

DESCRIPTION OF PREFERRED EMBODIMENTS

Figure 3:
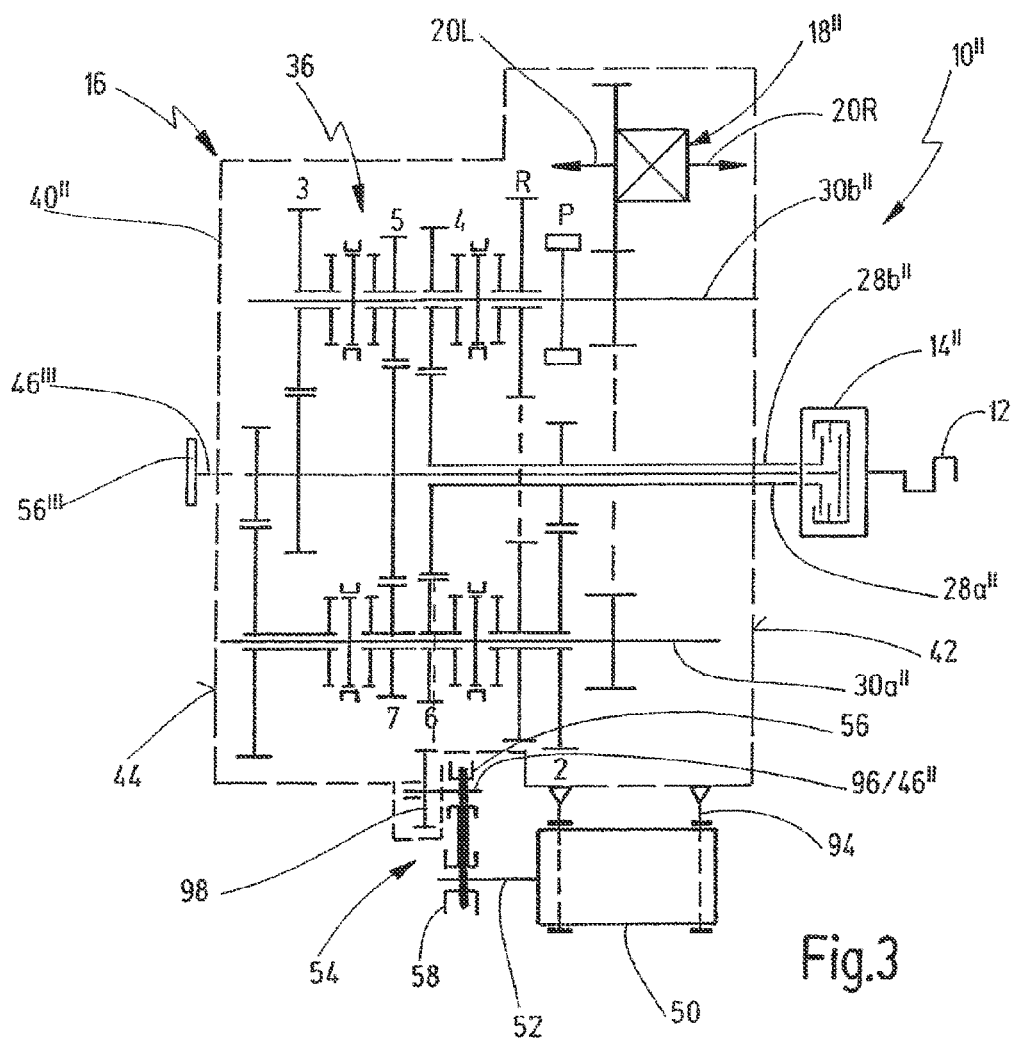
FIG. 3 is a schematic representation of a further embodiment of a drive train according to the invention.

FIG. 1 shows in schematic form a drive train, generally denoted by reference 10, for a motor vehicle such as a passenger car.

The drive train 10 comprises an internal combustion engine 12, a clutch arrangement 14, a transmission arrangement 16, a differential 18 and driven wheels 20L, 20R.

A crankshaft 22 of the internal combustion engine 12 is connected preferably rigidly to an input member 24 of the clutch arrangement 14. In the present case the clutch arrangement has a single output member 26, which is connected preferably rigidly to an input shaft 28 of the transmission arrangement 16. The transmission arrangement 16 further includes an output shaft 30 and a layshaft 32. The layshaft 32 is connected to the input shaft 28 via a constant-ratio gear set 34. The transmission arrangement 16 further includes a plurality of gear sets for implementing different gear stages, one of which is shown schematically at 36.

The output shaft 30 of the transmission arrangement 16 is connected to the input of the differential 18 which distributes drive power to the driven wheels 20L, 20R. The transmission arrangement 16 has a transmission housing 40 with a first axial end 42 oriented towards the internal combustion engine 12 and a second axial end 44 on the side oriented away from the internal combustion engine 12.

The layshaft 32 has a shaft section 46 which extends from the transmission housing 40 on the side of the second axial end 44. Self-evidently, a suitable shaft seal, not designated in detail in FIG. 1, may be provided for sealing between the shaft section 46 and the transmission housing.

The drive train 10 further includes an electric machine 50 which is aligned parallel to the shafts of the transmission arrangement 16 and is fixed to an outer side of the transmission housing 40. The electric machine 50 has a motor shaft 52 which is arranged parallel to and offset from the shaft section 46. The motor shaft 52 is connected via a traction drive mechanism 54 to the shaft section 46, outside the transmission housing 40. The traction drive mechanism 54 comprises a first traction drive wheel 56 connected rigidly to the shaft section 46 and a second traction drive wheel 58 connected preferably rigidly to the motor shaft 52. A traction means connecting the traction drive wheels 56, 58 is denoted schematically by reference 60 in FIG. 1. The traction means may be a chain or a belt, for example a V-belt or a toothed belt.

The clutch arrangement 14 has a clutch housing 64 which may be flange-mounted directly to the transmission housing 40, as indicated schematically in FIG. 1. Furthermore, the differential 18 has a differential housing 66 which may be formed separately from the transmission housing 40 but may also be integrated with the transmission housing 40, as is indicated schematically in FIG. 1.

The drive train 10 of FIG. 1 has a layout which is designed for longitudinal installation in a motor vehicle. However, the drive train 10 may also be designed for transverse installation in a motor vehicle.

The traction drive mechanism 54 is preferably arranged adjacent to the second axial end 44, that is, on the side of the transmission housing 40 oriented away from the internal combustion engine 12. In order to tension or slacken the traction means, a separate tensioning roller, which may be fixable adjustably to the outside of the transmission housing, may be provided. Alternatively, it is possible to fix the electric machine 50 to the transmission housing 40 adjustably in a direction transverse to the extension of the motor shaft 52.

It is apparent from the representation in FIG. 1 that it is alternatively possible to configure the layshaft 32 not to extend from the transmission housing 40, but to fix the first traction drive wheel 56, for example, to the output shaft 30 of the transmission arrangement 16. In a configuration of the drive train for front transverse installation in the motor vehicle, the input shaft frequently extends over the full length of the transmission housing 40, so that it is also possible in this case to configure the input shaft such that a shaft section thereof extends axially from the transmission housing 40, on the side of the axial end 44. In this way it is possible to connect the electric machine to an input shaft of the transmission arrangement.

Of course, it is also possible in general to arrange the traction drive mechanism 54 on the side oriented towards the combustion engine 12, that is, on the first axial end 42.

Finally, it is possible to provide a countershaft in the transmission arrangement 16 which is axially shorter than the transmission housing 40 and extends, in a region between the axial ends 42, 44, from a middle section of the transmission housing 40, as will be described below. In this case the traction drive mechanism 54 may also be arranged axially between the two axial ends 42, 44 of the transmission housing 40.

FIG. 2 shows a further embodiment of a drive train 10' which corresponds generally to the drive train 10 of FIG. 1 with regard to structure and operation. Like elements are therefore designated by the same reference symbols. In what follows, primarily the differences will be explained.

Thus, FIG. 2 shows an input shaft 28' which extends from the transmission housing 40 in an axial direction and has a shaft section 46' which is located outside the transmission housing 40. The shaft section 46' has a splined section 70. The first traction drive wheel 56 has a through-bore with a complementary splined section 72, such that the first traction drive wheel 56 can be fitted to the shaft section 46' in the axial direction.

The first traction drive wheel 56 has a hollow shaft section 73 which extends at least partially into the transmission housing 40 and is therefore formed on the side of the first traction drive wheel 56 oriented towards the transmission housing 40.

The first traction drive wheel 56 is fixed to the shaft section 46' by means of a screw 74. For this purpose the input shaft 28' has a threaded bore 76 which is formed concentrically with an axial bore 78 which may optionally be provided, for example as an oil passage or to reduce weight.

The first traction drive wheel 56 has on the side oriented away from the transmission housing 40 a fastening bore 80 which is provided coaxially with the through-bore and has a larger diameter than the threaded bore 76, which diameter is adapted to the diameter of a head of the screw 74. In the fastened state represented, the head of the screw 74 therefore engages axially against a base shoulder of the fastening bore 80 and in this way fixes the first traction drive wheel 56 axially to the input shaft 28'. A sealing plug 82 is preferably also received in the fastening bore 80, and preferably is fixed in the fixing bore 80 in the axial direction by means of a circlip 84. The sealing plug 82 is therefore located between the circlip 84 and the head of the screw 74 and seals the fastening arrangement in a fluid-tight manner between the first traction drive wheel 56 and the input shaft 28'.

The transmission housing 40 has a housing opening 86 concentric with the input shaft 28'. The hollow shaft section 73 of the first traction drive wheel 56 extends axially through the housing opening 86. A shaft seal 90, which ensures a fluid-tight seal between the interior of the transmission housing 40 and the outside, is fixed between an inner face of the housing opening 86 and an outer circumference of the hollow shaft section 73. The shaft seal 90 is located adjacent to a shaft bearing 88, by means of which the input shaft 28' is mounted rotatably in the transmission housing 40 adjacent to the second axial end 44. The hollow shaft section 73 is preferably supported in the radial direction by the shaft bearing 88, preferably by an inner race thereof.

FIG. 3 shows a further embodiment of a drive train 10" which corresponds generally to the drive train 10 of FIG. 1 or 2 with regard to structure and operation. Like elements are therefore denoted by the same reference symbols. In what follows, primarily the differences will be explained.

The drive train 10" includes a transmission arrangement 16 in the form of a dual-clutch transmission which is designed for front transverse installation in a motor vehicle. The clutch arrangement 14" includes two friction clutches, the output members of which are connected to a first input shaft 28a" and to a hollow shaft concentric therewith in the form of a second input shaft 28b". The first input shaft 28a" extends the full length of the transmission housing 40" and may emerge from the transmission housing 40", for example at the end (second axial side 44) oriented away from the internal combustion engine 12, as is indicated schematically by a shaft section 46", to which a first traction drive wheel 56" is fixed. However, this variant is shown only for the sake of completeness in FIG. 3, since the connection between transmission arrangement 16 and electric machines is generally implemented differently here, as will be described below.

The transmission arrangement 16 further includes a first output shaft 30a" and a second output shaft 30b", which are each arranged parallel to and offset from the input shaft arrangement and on which are mounted loose wheels which are connectable to the shaft associated with them by means of respective shift clutches, as is generally known in the field of dual-clutch transmissions. The forward gear stages are here denoted by references 1 to 7. In addition, a reverse gear stage R and a parking lock arrangement P are shown.

The output shafts 30a", 30b" each have a respective output wheel, the output wheels each engaging with a respective input member of a differential 18" which is arranged inside the transmission housing 40.

The electric machine 50, viewed in the axial direction, is fixed between two axial ends 42, 44 provided radially on the outside of the transmission housing 40, by means of a fastening device 94 which may be rigid or adjustable.

In addition, a countershaft 96 is mounted rotatably in the transmission housing 40, parallel to and offset from the input shafts 28a", 28b" and parallel to and offset from the output shafts 30a", 30b". For this purpose the transmission housing 40 has a radial recess which is not designated in detail in FIG. 3. A secondary gear wheel 98 is fixed to the countershaft 96. The countershaft 96 extends from the transmission housing 40 in the axial direction, into a region between the two axial ends 42, 44. In this embodiment the motor shaft 52 of the electric machine 50 extends in a direction away from the internal combustion engine 12 and is arranged adjacent to the first axial end 42, although it may also be arranged adjacent to the second axial end 44. In the latter case, the motor shaft 52 would extend towards the internal combustion engine 12. As in the previous embodiments, the motor shaft 52 is connected to a second traction drive wheel 58 which is connected via a traction means 60 to a first traction drive wheel 56, the first traction drive wheel 56 being fixed to a shaft section 46" formed by the countershaft 96.

In this embodiment, the secondary gear wheel 98, as indicated by a broken line, may mesh, for example, with a gear wheel which is connected rigidly to the second input shaft 28b", in order to be able in this way to connect the electric machine to the second partial transmission, which is associated with the even-numbered gear stages. Alternatively, of course, it is possible to arrange the countershaft 96, or its secondary gear wheel 98, and the traction drive mechanism 54 in such a way, in the axial direction, that the secondary gear wheel 98 meshes with a wheel which is connected rigidly to the first input shaft 28a". In general it is also possible to configure the secondary gear wheel 98 to be displaceable in the axial direction in order to connect it alternatively to a gear wheel of the first input shaft 28a" or to a gear wheel of the second input shaft 28b". It is also possible to provide a corresponding shift clutch arrangement for this purpose. Whereas, in the embodiment in which the first traction drive wheel 56''' is connected to the first input shaft 28a", the transmission ratio between electric machine 50 and input shaft 28a" is determined solely by the traction drive mechanism 54, in the embodiment of FIG. 3 this overall transmission ratio is determined by the ratio of the traction drive mechanism 54 and by the ratio between the secondary gear wheel 98 and the gear wheel connected to the respective input shaft.

Figure 4:
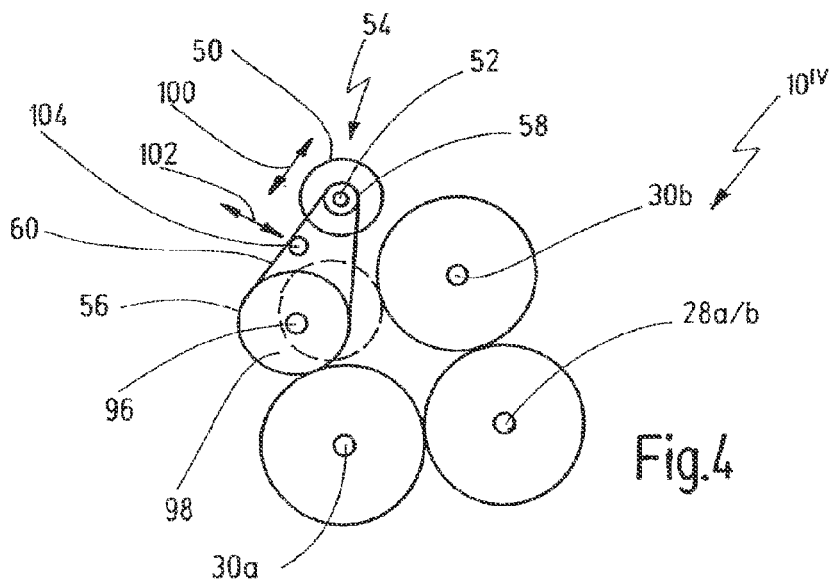
FIG. 4 is a schematic axial plan view of a further embodiment of a drive train according to the invention.

FIG. 4 shows schematically a drive train $10^{IV}$ which may correspond generally to the drive train 10" of FIG. 3 with regard to structure and operation. Like elements are therefore denoted by the same reference symbols. In what follows, primarily the differences will be explained.

FIG. 4 shows here a schematic axial plan view of the transmission arrangement, from which it can be seen that the two output shafts 30a, 30b are in engagement with respective gearwheels of the input shafts 28a/28b. In an automated manual transmission, two such output shafts 30a, 30b may also be connected to an input shaft arrangement which has only a single input shaft.

It can further be seen that in the embodiment of FIG. 4 a countershaft 96 is arranged within an angular range which is formed by a connecting line between the input shaft arrangement 28a/b and the first output shaft 30a, and a connecting line between the input shaft arrangement 28a/b and the second output shaft 30b. In the present case the secondary gear wheel 98 meshes with a gear wheel which is connected to the first output shaft 30a. Alternatively, as indicated by a broken line, the secondary gear wheel 98 may also mesh with a gear wheel which is connected to the second output shaft 30b. In the same way it is possible to arrange the countershaft 96 in such a way that the secondary gear wheel 98 meshes with a gear wheel of the input shaft arrangement 28a/b, as was described above in relation to FIG. 3.

In the present case the traction drive mechanism 54 includes tensioning means 100 in order to tension or slacken (in the latter case for disassembly purposes, for example) the traction means 60. The tensioning means 100 may be formed, for example, by an adjustability of the electric machine 50 in a direction transverse to the motor shaft 52, as is indicated by an arrow in FIG. 4.

It is further possible to provide, alternatively or additionally, tensioning means 102 which are formed, for example, by means of a tensioning roller 104 which is mounted adjustably in a direction transverse to the motor shaft 52, on the outside of a transmission housing.

The tensioning means 100 or 102 may further be configured as elastic tensioning means in order to obtain permanently a largely constant tension of the traction means.

The invention claimed is:

1. Drive train for a motor vehicle, comprising:
an internal combustion engine which has a crankshaft and is designed to provide drive power for the motor vehicle;
a clutch arrangement which has an input member and at least one output member, the input member being connected to the crankshaft;
a transmission arrangement for implementing a plurality of gear stages, the transmission arrangement having a transmission housing, at least one input shaft and at least one output shaft, the output shaft being connectable to driven wheels of the motor vehicle; and
an electric machine which is designed to provide drive power for the motor vehicle and is connected to a transmission shaft of the transmission arrangement;
wherein the transmission shaft has a shaft section which extends from the transmission housing and is connected to the electric machine via a traction drive mechanism; and
wherein the transmission shaft is the at least one input shaft of the transmission arrangement or a layshaft of the transmission arrangement which is connected to the input shaft via a fixed transmission ratio.

2. Drive train according to claim 1, wherein the transmission housing has a first axial end oriented towards the internal combustion engine and a second axial end oriented away from the internal combustion engine, the traction drive mechanism being arranged at the second axial end.

3. Drive train according to claim 1, wherein the shaft section which extends from the transmission housing has a splined section, a first traction drive wheel of the traction drive mechanism having a complementary splined section and the first traction drive wheel being fitted to the splined section.

4. Drive train according to claim 1, wherein the traction drive mechanism has a first traction drive wheel, the shaft section of the transmission shaft having a threaded axial bore and the first traction drive wheel being fixed axially to the shaft section by means of a screw.

5. Drive train according to claim 4, wherein the first traction drive wheel has an axial fixing bore in which a head of the screw and a sealing element are received.

6. Drive train according to claim 1, wherein the traction drive mechanism has a first traction drive wheel which has a hollow shaft section extending around the shaft section of the transmission shaft, a shaft seal being arranged between a housing opening of the transmission housing and the outer circumference of the hollow shaft section of the first traction drive wheel.

7. Drive train according to claim 1, wherein the electric machine is fixed rigidly or adjustably to an outer side of the transmission housing by means of a fastening device.

8. Drive train according to claim 1, wherein the transmission shaft is a countershaft which is arranged parallel to and offset from the at least one input shaft and parallel to and offset from the least one output shaft, on which countershaft a secondary gear wheel for connecting the countershaft to the at least one input shaft is mounted.

9. Drive train according to claim 1, wherein the transmission shaft is a countershaft which is arranged parallel to and offset from the at least one input shaft and parallel to and offset from the least one output shaft, on which countershaft a secondary gear wheel for connecting the countershaft to the at least one output shaft is mounted.

10. Drive train according to claim 8, wherein the transmission housing has a first axial end oriented towards the internal combustion engine and a second axial end oriented away from the internal combustion engine, the traction drive mechanism being arranged in the axial direction between the first and second axial ends of the transmission housing and radially on the outside of the transmission housing.

11. Drive train according to claim 9, wherein the transmission housing has a first axial end oriented towards the internal combustion engine and a second axial end oriented away from the internal combustion engine, the traction drive mechanism being arranged in the axial direction between the first and second axial ends of the transmission housing and radially on the outside of the transmission housing.

12. Drive train according to claim 1, wherein the electric machine is connected to the input shaft of the transmission arrangement via a fixed or constant ratio, such that the relative rotational speed of the electric machine with respect to the input shaft of the transmission arrangement at all times the electric machine is operating is defined by the fixed or constant ratio.

13. Drive train according to claim 12, wherein a connection of the electric machine to the output shaft is selectively disconnectable while the electric machine remains connected to the input shaft directly or via the fixed transmission ratio.

14. Drive train according to claim 1, wherein a connection of the electric machine to the output shaft is selectively disconnectable while the electric machine remains connected to the input shaft directly or via the fixed transmission ratio.

15. Drive train for a motor vehicle, comprising:
an internal combustion engine which has a crankshaft and is designed to provide drive power for the motor vehicle;
a clutch arrangement which has an input member and at least one output member, the input member being connected to the crankshaft;
a transmission arrangement for implementing a plurality of gear stages, the transmission arrangement having a transmission housing, at least one input shaft and at least one output shaft, the output shaft being connectable to driven wheels of the motor vehicle; and an electric machine which is designed to provide drive power for the motor vehicle and is connected to a transmission shaft of the transmission arrangement;

wherein the transmission shaft has a shaft section which extends from the transmission housing and is connected to the electric machine via a traction drive mechanism, the traction drive mechanism being located outside of the transmission housing between the shaft section and the electric machine; and wherein the transmission shaft is the at least one input shaft of the transmission arrangement or a layshaft of the transmission arrangement which is connected to the input shaft via a fixed transmission ratio.

* * * * *